United States Patent [19]
Bjorklund et al.

[11] 3,991,386
[45] Nov. 9, 1976

[54] ACTIVE OPTICAL DEVICES WITH SPATIALLY MODULATED POPULATIONS OF F-CENTERS

[75] Inventors: Gary Carl Bjorklund, West Windsor; Linn Frederick Mollenauer, Colts Neck, both of N.J.

[73] Assignee: Bell Telephone Laboratories, Incorporated, Murray Hill, N.J.

[22] Filed: Sept. 25, 1975

[21] Appl. No.: 616,572

[52] U.S. Cl. .............................. 331/94.5 F; 330/4.3
[51] Int. Cl.$^2$ .......................................... H01S 3/16
[58] Field of Search ...................... 331/94.5; 330/4.3

[56] References Cited
OTHER PUBLICATIONS

Mollenauer, et al., Broadly Tunable Lasers Using Color Centers, J. Appl. Phys., vol. 46, No. 7 (July 1975) pp. 3109–3118.
Mollenauer, et al., A Broadly Tunable CW Laser Using Color Centers, Appl. Phys. Lett., vol. 24, No. 8 (Apr. 15, 1974) pp. 386–388.
Fritz, et al., Laser Effect in KCl with $F_A$(Li) Centers, Solid State Communications, vol. 3, No. 3 (1965) pp. 61–63.

*Primary Examiner*—William L. Sikes
*Attorney, Agent, or Firm*—Wilford L. Wisner

[57] ABSTRACT

The disclosed distributed feedback laser employs an alkali halide crystal having a spatially modulated pattern of a stable color center and a complementary spatially modulated pattern of U-centers. The stability of the color centers is provided by initial additive coloration, conversion to U-centers, and subsequent reconversion; and the spatial modulation is provided by patterning the reconversion by exposing a portion of the crystal to an interference pattern of coherent light. Conversion occurs by two-photon absorption. The very large penetration depth and the use of ultraviolet frequencies that are only about one-half of the magnitude of the frequencies that would otherwise be required make this device and process attractive for thick holograms and for distributed feedback devices such as lasers.

7 Claims, 3 Drawing Figures

ACTIVE OPTICAL DEVICES WITH SPATIALLY MODULATED POPULATIONS OF F-CENTERS

BACKGROUND OF THE INVENTION

This invention relates to active optical devices, such as lasers, employing color centers and patterns thereof.

Recently there has been reported increasing interest in the properties of color centers in alkali halide crystals; and, in particular, a very transient type of phenomenon producing color centers by two-photon absorption has been reported. See the aticle by J. N. Bradford et al., *Physical Review Letters*, Volume 35, page 300 (1975).

The very short lifetime of the created color centers described in that work make them relevant only to the advancement of physical science, and not to practical devices.

Nevertheless, we have recognized that two-photon absorption for the production of color centers could be very useful because of the possibility of greater penetration depth into a material than has heretofore been realized in other radiation absorption processes involving color centers, and because there are no appropriate very short ultraviolet wavelength lasers, such as would be desired to create the stable color centers by single photon absorption. It is therefore an object of this invention to provide more practical, long-lived devices employing color centers generated by two-photon absorption.

SUMMARY OF THE INVENTION

We have discovered that stable color centers in the alkali halide crystals are produced by an efficient two-photon room-temperature process involving the conversion of U-centers to F-centers.

Our invention, based on this discovery, is directed both to that process and to coherent optical apparatus of the type comprising an alkali halide crystal that has initially been additively colored and that includes thereafter a substantially uniform density of U-centers in at least a portion thereof.

U-centers are a colorless type of center in an alkali halide crystal made by converting F-centers therein by drifting hydrogen through the crystal, for example, as described in the copending patent application of L. F. Mollenauer, Ser. No. 554,467, filed Mar. 3, 1975, and assigned to the assignee hereof.

According to a feature of our invention, the apparatus is characterized by a spatially modulated pattern of stable color centers produced from the U-centers, which have a pattern complementary to the pattern of the color centers, both patterns being created by an interference pattern of coherent ultraviolet light of photon energy appropriate for two-photon absorption. The interference pattern converts U-centers to F-centers in the illuminated interference fringes. Advantageously, a device employing this feature benefits from the large penetration depth achievable by two-photon absorption. Further advantageously, for devices desired to use $F_A(II)$ color centers, the crystal initially includes an appropriate doping impurity, such as lithium or sodium.

According to still another feature of our invention, distributed feedback active devices, such as distributed feedback lasers, are provided with the above-described complementary patterns of U-centers and F-centers, the laser being provided with appropriate end surfaces and pumping means and being mounted upon an alkali halide crystal of lattice like that of the centers.

According to yet another feature of our invention, the deep penetration depth of the two-photon description yields deep, substantially uniform interference patterns, as is appropriate for thick holograms in alkali halide crystals.

Advantageously, all of the foregoing devices are particularly useful in the infrared region of the spectrum from about 1 micrometer to about 3.3 micrometers, in which the color centers created by our technique can be made to absorb and emit light, or at least to scatter light. This region of the spectrum is becoming of increasing importance for the spectroscopic study of new materials, for the conrol of production processes involving those new materials, and for the detection and measurement of many air pollutants.

Although the devices according to our invention will typically be cooled in operation well below room temperature, it is a particular feature and advantage of the process acording to our invention that no cooling is needed for any part of the process of making the devices; and the exposure for two-photon absorption is preferably done at room temperature.

BRIEF DESCRIPTION OF THE DRAWING

Further features and advantages of our invention will become apparent from the following detailed description, taken together with the drawing, in which.

DESCRIPTION OF ILLUSTRATIVE EMBODIMENTS

Figure 1:
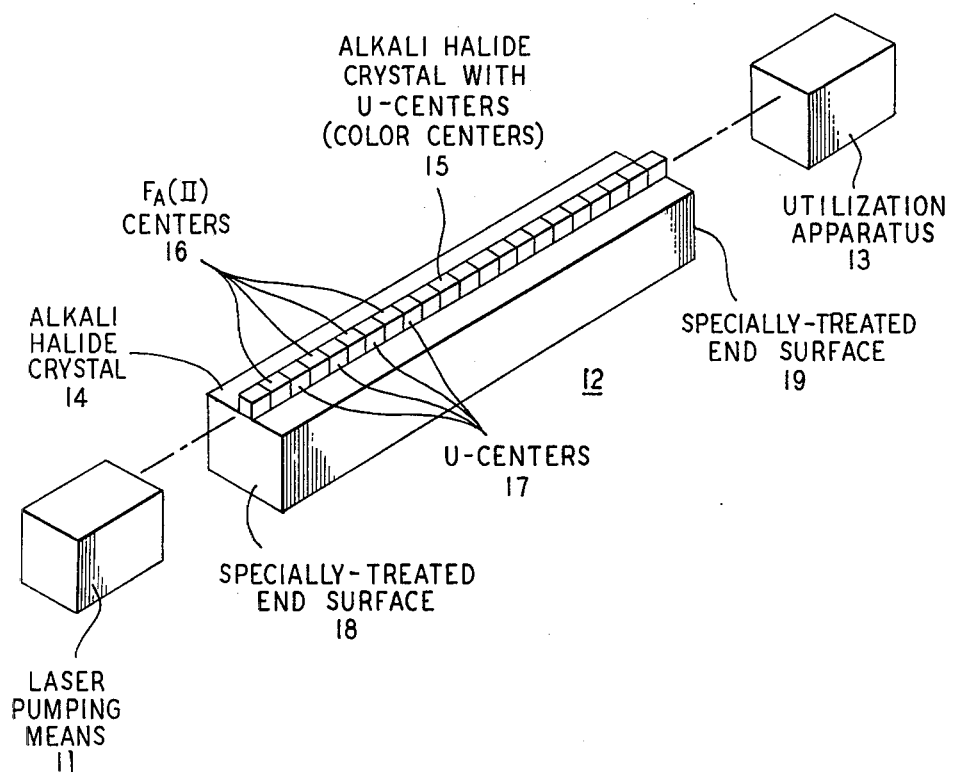
FIG. 1 is a partially pictorial and partially block diagrammatic illustration of a distributed feedback laser according to our invention.

The apparatus shown in FIG. 1 is one exemplary device based upon our discovery of a way to make stable patterns of color centers in alkali halide crystals by two-photon absorption, as will become clearer hereinafter.

The device of FIG. 1 is a distributed feedback laser consisting primarily of the laser active medium, its support, and its resonator, together designated as 12. The laser is pumped with coherent light from another laser 11 or other light source such as an arc lamp at an appropriate wavelength to establish population inversion within the regions 16 having the stable color centers. The output stimulated emission of coherent radiation is illustratively transmitted through partially transmissive end surface 19 toward utilization apparaus 13.

Illustratively, the base crystal 14 is potassium chloride and the doped crystal 15 supported thereon is potassium chloride doped with lithium in order to make possible stable $F_A(II)$ color centers.

To provide the distributed feedback effect for the distributed feedback laser, the color centers 16 alternate with the inactive U-centers along the optical pathlength of the doped crystal 15 between end surfaces 18 and 19. In the typical case, the distributed feedback effect for a practical length of crystal 15 is sufficiently strong that end surfaces 18 and 19 need be nothing more than polishd end faces of crystal 15 and, indeed, with a sufficient length of crystal 15, can be replaced by anti-reflection coatings or Brewster-angle end surfaces. In that case, the stimulated emission of coherent radiation is provided with the needed optical resonator or multipass properties of the emitted light yielded purely by the distributed feedback effect.

Figure 2:
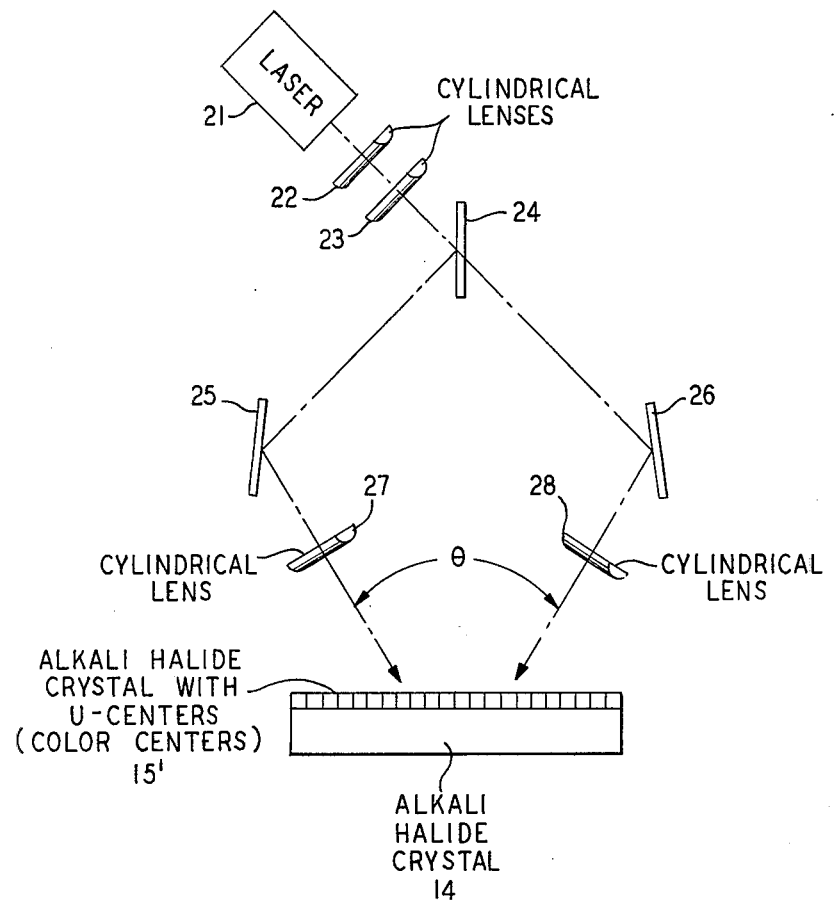
FIG. 2 is a partially pictorial and partially block diagrammatic illustration of the apparatus employed in producing the spatially modulated patterns of F-centers and U-centers.

The $F_A(II)$ centers not only alternate with U-centers 17, but are initially created from a uniform density thereof by two-photon absorption, which we have found to be substantially uniform to the depth represented in the dimension along which the exposing light enters during the making of the laser 12, e.g., from the top in FIGS. 1 and 2. The process of producing the pattern in crystal 15 will be more fully described hereinafter in connection with FIG. 2.

Illustratively, pump laser 11 is a krypton ion laser operating at about 0.647 micrometer (6471A) or an arc lamp operating in a range spanning that wavelength; and the laser 12 emits at about 2.5 to 2.9 micrometers, depending on the repetition period for the distributed feedback ffect. Illustratively, the spacing of color centers 16 would be uniformly a multiple of a half wavelength of the laser light to be emitted.

Other principles of distributed feedback lasers are disclosed in U.S. Pat. No. 3,760,292 to H. W. Kogelnik et al., issued Sept. 18, 1973, and in the book by G. A. Evans entitled "Electromagnetic Theory of Distributed Feedback Lasers in Periodic Dielectric Waveguides," September, 1974, available from the National Technical Information Service as Report No. AFOSR-TR-74-1747.

With reference to the processing apparaus of FIG. 2, the pattern of color centers is creatd as follows:

The laser crystals 15 were prepared as follows: Platelets of the desired thickness ($t \sim 1$–2 mm) were cleaved out of a KCl:Li crystal containing about $10^{18}$ U-centers/cm$^3$. U-centers are made by drifting hydrogen through a KCl crystal containing F-centers. The F-centers were illustratively made by the well-known proces of additive coloration, as explained in detail by C. Z. vanDoorn, *Review of Scientific Instruments*, Vol. 32, page b 755 (1961). The hydrogen converts F-centers to U-centers.

The two opposing large faces (100) planes, of a cleaved platelet were then optically polished. Since the U-centers absorb only in the u.v., the U-center absorption band in potassium chloride occurring at about 210 nanometers (2100A), the resultant clarity of the crystal greatly facilitated inspection for surface flaws, strainin-duced birefringence, and other possible defects.

In order to produce the electron-hole pairs by the two-photon absorption effect of our invention, intense pulses of light at $\lambda = 266$ nm from source 21 (the fourth harmonic of a Nd:YAG laser, fourth harmonic pulse energy $\sim 1$ m joule, duration $\sim 8$ nsec, repetition rate $\sim 5$/sec), after passing through a spatial filter, then impinge on the crystal 15' of KCl, at temperature $T = 300°$ K, in the desired interference pattern. The cylindrically focused beams are produced from the output of laser 21 by beam splitter 24 and directed on to the crystal by reflectors 25 and 26 at the selected angle $\theta$. Lenses 22, 23, 27 and 28 were the cylindrical lenses. In some basic experiments, growth of the F band absorption was continuously monitored with a special dual-beam absorption apparatus that has been described by L. F. Mollenauer, et al., *Review of Scientific Instruments*, Vol. 26, page 677 (1975). In actual use of a device, monitoring is not needed.

Figure 3:
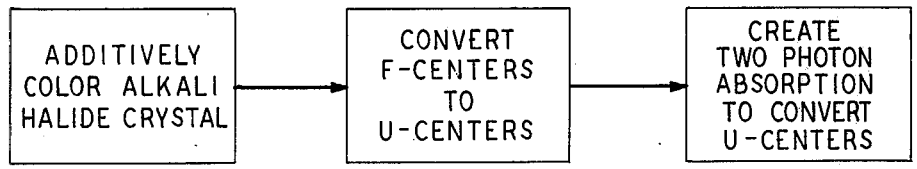
FIG. 3 is a flow diagram for the process.

The process just described is summarized generally in the flow diagram of FIG. 3 which is seen to involve, at minimum, three sequential steps.

For the experiments described here, the monitor beam had a square cross section at the crystal about 60 $\mu$m on each side. Thus only the uniformly colored center of the spot was measured. Additionally, a small sample of the 266 nm pulses was detected, and a signal representing the energy in each pulse obtained. Those signals were then electronically squared and integrated, yielding an electrical analog or the quantity $$\xi' = \Sigma [\int I_i \, dt]^2. \tag{1}$$

As long as the pulse shapes remain constant in time, $\xi'$ is directly proportional to the true two-photon exposure $$\xi = \sum_i \int I_i^2 \, dt. \tag{2}$$

The typical curve of coloration versus exposure, (not shown) has an initial steep rise whose slope is essentially independent of $U_o$ for $U_o \geq 1 \times 10^{17}$/cm$^3$. The curve bends over and finally saturates at an optical density determined by $U_o$ and by the mean intensity I of the u.v. light pulses. For each crystal the initial portion of the curve was independent of the mean pulse intensity, verifying that the initial coloration results from a two-photon process. In all our experiments the samples were always optically thin for the laser beam.

Without wishing to limit our invention thereby, we propose to explain the operation of our invention as follows:

In summary, the conversion proceeds by energy transfer by electron-hole pair annihilation at a U-center site, rather than by direct photoexcitation of the U-center. In more detail, first, two-photen absorption by the lattice of the alkali halide crystal produces electron-hole pairs. The electrons are efficiently trapped by U-centers and F-centers. When the holes, which are less mobile than the electrons, catch up to the trapped electrons, the energy released upon electron-hole annihilation serves to convert the U-centers into F-centers with 100 percent quantum efficiency.

Our model also allows for the existence of the reverse process converting F-centers to U-centers with a certain unknown efficiency $\eta$. Thus, the time-average behavior of the coloration process should be governed by the equation $$\frac{dF}{dt} = N \frac{\sigma_U U - \eta \sigma_F F}{\sigma_U U + \sigma_F F + \sigma_L L} \tag{3}$$

where $N$ is the number of electron-hole pairs generated per cm$^3$ per sec, where $F$, $U$, and $L$ are the F-center, U-center, and halide-ion densities, respectively, and where $\sigma_U$, $\sigma_F$ and $\sigma_L$ represent the electron capture cross sections of U-centers, F-centers and halide ions, respectively. The general solution to Equation (3) is:

$$F(1-\beta) - \left\{ \frac{(1+\eta)\beta}{1+\eta\beta} U_o + \gamma \right\} \ln \left\{ 1-(1+\eta\beta)F/U_o \right\} = (1+\eta\beta)Nt \tag{4}$$

where $\beta \equiv \sigma_F/\sigma_U$ and $\gamma \equiv \sigma_L/\sigma_U$. (It is assumed that $F + U = U_o$.) For $F/U_o << 1$, Equation (4) reduces to $$F \cong Nt/(1+\gamma/U_o) \qquad (5)$$

whereas for very long times, Equation (4) becomes:

$$F \cong \{U_o/(1+\eta\beta)\} \{1-\exp(-\Gamma Nt)\} \qquad (6)$$

where $\Gamma$ is a function of $\eta$, $\beta$, $\gamma$, and $U_o$.

Strictly speaking, the above model is not yet complete. In the first place, it neglects the creation of F-centers from decay of self-trapped excitons. However, as noted above, the F-centers created in this way are largely unstable, and, in any event, the term to be added would be important only in the limit of very low U-center concentration. Second, we have observed that change in the mean pulse intensity is accompanied by change in the saturation coloration. Thus, to the right hand side of Equation (3), should be added a term $-\sigma_F'\eta'F I/\hbar\omega$, where 94 $_F'$ is the single-photon absorption cross section at $\lambda$ 32 266 nm, where I the mean intensity, and $\eta'$ the quantum efficiency for the back process $F \rightarrow U$. At the intensities used in most of our experiments, this term reduced the saturation coloration by as much as a factor of two. However, the effects of Equation (3) are apparently negligible at the highest intensities we have employed ($I \sim 20$ Mw/cm$^2$), and become important only for considerably lower values of I.

There is one more single-photon effect that is of great importance when the coloration is carried out at temperatures near 300° K. That is, photoionization of the F-centers by the u.v. beam initiates the well-known aggregation process, which in a pure crystal, converts them to $F_2$ and higher aggregate centers. To avoid that complication, our samples were heavily doped with lithium, to the extent of 0.1 percent. As is well known, the exclusive end product of the aggregation is then $F_A$ centers. The $F \rightarrow F_A$ conversion was essentially instantaneous on the time scale of our experiments. Further, we chose a monitor wavelength ($\lambda = 586$ nm), for which the F and $F_A$ absorption cross sections are the same.

According to Equation (3), the initial slopes of the coloration curves will be independent of $U_o$ when $U_o >> \gamma$. By contrast, for a model involving direct photoexcitation of the U-centers, the initial slope would always be directly proportional to $U_o$. The slopes are not affected by any back process. The best fit, in terms of Equation (3), to the behavior we measured was obtained for $\gamma = 4\times10^{16}$/cm$^3$. The deviation near $U_o = 0$ from the theoretical curve corresponds to the neglect, in Equation (3) of a term corresponding to creation of F-centers from self-trapped excitons, as discussed above. Nevertheless, the results show clearly that the model of Equation (3) is essentially the correct one, and that direct photo-excitation of the U-centers is not involved to any significant extent.

The exposure $\xi$ was calibrated in absolute units through a coordinated measurement of the mean laser power, the laser pulse duration, the density profile of the u.v. beam, and the number of pulses required for a unit displacement of the recorder pen along the X axis, which is the $\xi'$ axis. The average laser pulse energy was measured with an Epply thermopile placed just ahead of the crystal. A careful measurement of the initial slope of the coloration curve for a crystal containing a large density of U-centers ($U_o > 10^{18}$/cm$^3$) then yielded $N/\xi$, from which we obtained the value $\sigma_2 = 7\times10^{-50}$cm$^4$/w per KCl molecule for the two-photon absorption cross section at $\lambda =266$ nm. By far the largest source of error in the above stems from fluctuations of the laser power with time, and leads to an uncertainty in the above number on the order of a factor of two.

Prolonged exposure to the highest intensities in the interference fringes produces a better than 50 percent complete conversion of $U \rightarrow F$, as determined both from the coloration produced and from measurements of the decline of the U-band. Thus we infer that $\eta\beta << 1$, and that the initial curvature of the coloration curves will depend almost exclusively on $\beta$ and $U_o$, for large $U_o$. By a careful fitting to the initial part of the curves, we obtain $\beta \cong 8 \pm 2$. From the saturation behavior of the curves we obtain the limits $2\times10^{-22}$cm$^2 < \sigma_F'\eta' < 9\times10^{-22}$cm$^2$, where the lower limit corresponds to assuming $\eta\beta = 1$, and the upper limit to $\eta\beta = 0$. As indicated above, we have also made excellent fit of Equation (4) to existing x-ray coloration data on KBr, obtaining $\beta \sim 7$, and $\eta\beta \leq 0.1$.

We believe that the use of two-photon absorption has the advantages in practice of less damage to the crystal, more easily produced interference fringes, and more uniform exposure to a substantial depth in a given illuminated fringe plane. It can also be used to produce other devices, such as the photochromic devices described by Y. Shono, et al., *Applied Physics Letters*, Vol. 22, page 299 (1973). The application of such photochromic devices can extend to optical memories, displays and other apparatus useful in data processing and communication systems.

While no specific embodiment of a thick hologram made according to the technique shown in FIG. 2 is illustrated, it should also be clear that our invention is useful for making such devices. For one optical technique producing interference fringes for the exposure in making such a device, see U.S. Pat. No. 3,674,332, issued July 4, 1972 to H. W. Kogelnik. The distributed feedback pattern 16, 17 of crystal 15 of FIG. 1 can be treated as a special case of a thick hologram. The advantage of our two-photon absorption process in alkali halide crystal is the uniformity of exposure obtained along the thickness dimension.

Still further, the index change as associated with the resonance of the visible absorption of the reconverted color centers can be employed to produce optical waveguides in a U-center containing alkali crystal in which the guiding path is defined by a continuous strip of color centers reconverted from the U-centers by two-photon absorption, whereas U-centers remain in the surrounding material; and the light to be guided has a photon energy somewhat less than that needed to excite the resonance of the visible absorption of the reconverted color centers.

Even in the just described device, it can be considered that the crystal has complementary patterns of U-centers and color centers.

In general, the wavelength of the exposing light will be in the ultraviolet for most alkali halides, although it could be in the blue at about 420 nanometers (4200A) for rubidium iodide, and will always be longer than about 200 nanometers. Many known ultraviolet laser sources can be used. In mathematical terms, the exposing, wavelength is longer than the U-center absorption band wavelength for single-photon absorption, which, in turn, is longer than the bandgap wavelength of the alkali halide host crystal, and is shorter than twice the bandgap wavelength of the alkali halide crystal. For the potassium halides, the exposing wavelength will be in the range from 200 nanometers to 300 nanometers.

What is claimed is:

1. Optical apparatus of the type comprising an alkali halide crystal additively colored and diffused with hydrogen, said crystal being characterized by a spatially modulated pattern of stable color centers and a spatially modulated pattern of U-centers complementary to the pattern of said color centers, said modulation patterns being formed with a depth and resolution that can be achieved by two-photon absorption of coherent ultraviolet light of wavelength longer than the wavelength of the U-center absorption band for single-photon absorption and shorter than that twice the bandgap wavelength of said alkali halide crystal.

2. Optical apparatus according to claim 1 in which the patterns are selected to provide a distributed feedback effect for a selected radiation wavelength along the direction of maximum variation of the patterns, the apparatus including means for pumping the crystal to produce a population inversion among said stable color centers.

3. A process for producing patterns of stable color centers in an alkali halide host crystal, comprising the steps of additively coloring the crystal to create color centers therein, converting the color centers to U-centers, and exposing the crystal to coherent ultraviolet radiation of wavelength selected longer than the single-photon U-center absorption band wavelength thereof and shorter than twice the alkali halide bandgap wavelength to produce two-photon absorption by the alkali halide host crystal, said absorption yielding conversion of U-centers to stable color centers.

4. A process for producing stable color centers in an alkali halide crystal, comprising the steps of providing the crystal in at least a portion thereof with an impurity facilitating stable aggregate color centers, additively coloring the crystal to produce color centers, converting the color centers to U-centers by hydrogen drift, and exposing said crystal to radiation selected to produce two-photon absorption by the alkali halide crystal, said two-photon absorption converting said U-centers to aggregate F-centers.

5. A process according to clam 4 in which the exposing step comprises controlling the intensity and duration of two-photon absorption to yield $F_A(II)$ centers.

6. A process according to claim 4 in which the exposing step involves creating an interference pattern of the selected radiation.

7. A process according to claim 4 in which the crystal is a potassium halide and the wavelength of the selected radiation is in the range between about 200 nanometers and about 300 nanometers.

* * * * *